(12) United States Patent
Hosaka

(10) Patent No.: US 11,994,225 B2
(45) Date of Patent: May 28, 2024

(54) SOLENOID VALVE MANIFOLD

(71) Applicant: KOGANEI CORPORATION, Koganei (JP)

(72) Inventor: Syuichi Hosaka, Tokyo (JP)

(73) Assignee: KOGANEI CORPORATION, Tokyo (JP)

( * ) Notice: Subject to any disclaimer, the term of this patent is extended or adjusted under 35 U.S.C. 154(b) by 105 days.

(21) Appl. No.: 17/917,688

(22) PCT Filed: Mar. 31, 2021

(86) PCT No.: PCT/JP2021/014009
§ 371 (c)(1),
(2) Date: Oct. 7, 2022

(87) PCT Pub. No.: WO2021/210407
PCT Pub. Date: Oct. 21, 2021

(65) Prior Publication Data
US 2023/0151901 A1 May 18, 2023

(30) Foreign Application Priority Data
Apr. 13, 2020 (JP) .................................. 2020-071509

(51) Int. Cl.
*F16K 27/02* (2006.01)
*F16K 27/00* (2006.01)
(Continued)

(52) U.S. Cl.
CPC .......... *F16K 27/029* (2013.01); *F16K 27/003* (2013.01); *F16K 31/0675* (2013.01); *H01R 9/24* (2013.01)

(58) Field of Classification Search
CPC ............... F16K 27/029; F16K 31/0675; F15B 13/0857; H01R 9/24; H01R 13/5841; H01R 13/6453; H01R 13/6456
See application file for complete search history.

(56) References Cited

U.S. PATENT DOCUMENTS

| 5,706,858 | A  | 1/1998 | Miyazoe et al. |
| 6,364,672 | B1 | 4/2002 | Miyazoe et al. |
(Continued)

FOREIGN PATENT DOCUMENTS

| JP | H09-133240 A   | 5/1997  |
| JP | 2003-301961 A  | 10/2003 |
(Continued)

OTHER PUBLICATIONS

International Search Report mailed on Jun. 22, 2021, in connection with International Application No. PCT/JP2021/014009 (5 pp., including machine-generated English translation).

*Primary Examiner* — Reinaldo Sanchez-Medina
(74) *Attorney, Agent, or Firm* — McCormick, Paulding & Huber PLLC

(57) ABSTRACT

A solenoid valve manifold 10 has: a wiring block 26 including a connector; a pedestal block 27 disposed on a solenoid valve aggregate; a support pin 32 that is provided to a support wall 31 provided to the pedestal block 27; a support hole 33 rotatably supports the wiring block 26; operation parts 43 that are provided at tip parts of leg portions 42 provided to end wall portions 34 of both ends of the wiring block; an engaging convex part 44 provided on each operation part 43; an engaging concave part 45 provided to the pedestal block 27 and engaged with the engaging convex part 44 when a connector 25 is held at an upright position; and an engaging concave part 46 engaged with the engaging convex part 44 when the connector 25 is held at a lateral position.

9 Claims, 7 Drawing Sheets

(51) Int. Cl.
F16K 31/06 (2006.01)
H01R 9/24 (2006.01)

(56) References Cited

U.S. PATENT DOCUMENTS 7,938,145 B2 * 5/2011 Phillips .............. F15B 13/0857
137/884
8,375,986 B2 * 2/2013 Miyazoe ............ F15B 13/0857
137/884

FOREIGN PATENT DOCUMENTS

| JP | 3456928 B2 | 10/2003 |
| JP | 2016-001020 A | 1/2016 |
| JP | 2016-098914 A | 5/2016 |

* cited by examiner (A)

(B)

(A)

(B)

(A)

(B)

(A)

(B)

(A)

(B)

SOLENOID VALVE MANIFOLD

CROSS-REFERENCE TO RELATED APPLICATIONS

This application is a National Stage application of International Patent Application No. PCT/JP2021/014009, filed on Mar. 31, 2021, which claims priority to Japanese Patent Application No. 2020-071509, filed on Apr. 13, 2020, each of which is hereby incorporated by reference in its entirety.

TECHNICAL FIELD

The present invention relates to a solenoid valve manifold including a solenoid valve aggregate formed by aggregating a plurality of solenoid valves.

BACKGROUND

A solenoid valve of such a type that a plurality of solenoid valves are aggregated on and attached to a support member is referred to as a solenoid valve manifold or a manifold solenoid valve. Each solenoid valve is formed by: a main valve block that is provided with a main valve shaft for switching flow paths; and a solenoid block installed on the main valve block. The solenoid valve manifold includes an integrated type or a separate type. The integrated type is such a type that the aggregated solenoid valves are mounted on a single manifold block. The separate type is such a type that each solenoid valve is mounted on a manifold block having the same thickness as that of the solenoid valve. In the separate type, the plurality of manifold blocks are aggregated, and the plurality of solenoid valves are aggregated. In the integrated type, the manifold block constitutes a support member. In the separate type, the main valve block and the solenoid block are attached to the manifold block provided with an output port, and the manifold block is attached to a DIN rail as a support member. Also in any type, the plurality of solenoid valves are aggregated to form the solenoid valve aggregate.

The main valve shaft is driven by a drive signal supplied to the solenoid in each solenoid block, and the flow path of fluid discharged to the output port is switched by the main valve shaft. A lead wire connected to the solenoid is connected to a connector provided on a wiring block. The wiring block is disposed adjacent to the solenoid valve aggregate composed of the plurality of solenoid valves.

In such a solenoid valve manifold, as disclosed in Patent Document 1 and Patent Document 2, there is a solenoid valve manifold switching to, according to an installation location or the like, any of an upward posture in which the connector is directed in an upper direction of the solenoid valve and a lateral posture in which the connector is directed in a lateral direction thereof.

Patent Document 1: Japanese Patent Application Laid-open No. 2003-301961

Patent Document 2: Japanese Patent Application Laid-open No. 2016-98914

SUMMARY

Problems to be Solved by the Invention

In the solenoid valve manifold of Patent Document 1, a connector is installed on a housing, and the housing is attached to a block cover of a wiring block so as to movably switch to an upward posture and a lateral posture. A support shaft protrudes from both end surfaces of the housing, and the support shaft becomes movable in a guide groove formed in the block cover. Flexure portions are provided on both side surfaces of the housing, and a locking protrusion is provided on each of the flexure portions. A first locking hole and a second locking hole with which the locking protrusions are engaged are formed on the block cover.

In order to switch the connector, that is, the housing from the lateral posture to the upward posture, the flexure portion is deformed to release engagement between the locking protrusion and the first locking hole, and the support shaft is moved along a horizontal direction portion of the guide groove to move the housing in the lateral direction. Next, after rotating the connector to the upward posture, the support shaft is moved along an upward and downward direction portion of the guide groove, and the locking protrusion is engaged with the second locking hole. When the connector is switched from the upward posture to the lateral posture, the locking protrusion is engaged with the first locking hole by a reverse procedure.

In this way, the solenoid manifold disclosed in Patent Document 1 needs to perform 4-stage operations of an operation of deforming the flexure portion to release the engagement between the locking protrusion and the locking hole, an operation of rotating the connector, an operation of sliding the support shaft, and an operation of engaging the locking protrusion with another locking hole, and thus a switching operation of the connector is complicated.

In the solenoid valve manifold of Patent Document 2, a connector is installed on a connector housing, and the connector housing is attached to a support stand so as to movably switch to an upward posture and a lateral posture. A first support shaft and a second support shaft protrude from both end walls of the connector housing, the first support shaft being provided in a flexure piece constituting an end wall part of the connector housing, and the second support shaft being supported by a standing portion provided on the support stand. The flexure piece is provided with a convex part at a position separating from the first support shaft, and a first fitting hole and a second fitting hole are formed on the end wall part of the support stand, the first fitting hole holding the connector in the lateral posture by engagement with the convex part, and the convex part being engaged with the second fitting hole when the connector is held in the upward posture.

In this solenoid valve manifold, the convex part is provided in the flexure piece provided with the first support shaft, and a protrusion amount of convex part is set shorter than a protrusion amount of first support shaft. By pushing the first support shaft to deform the flexure piece, fitting of the convex part and the fitting hole is released and a posture of the connector is switched. In order to release the fitting of the convex part and the fitting hole by deflecting the flexure piece provided with the first support shaft in this way, the first support shaft having a small diameter must be pushed into, and operability is poor. Moreover, one side of the flexure piece which constitutes one end wall of the connector housing is bent, the first support shaft needs to be pushed largely by a fingertip, and further the first support shaft needs to be pushed by one hand and the connector needs to rotate by the other hand, so that when the connector is rotated, the operation of bending the flexure piece to release the fitting of the convex part and the fitting hole is not good in operability.

An object of the present invention is to improve operability of a posture switching operation of the connector of a solenoid valve manifold.

Means for Solving the Problems

A solenoid valve manifold of the present invention having a solenoid valve aggregate formed by aggregating a plurality of solenoid valves, the solenoid valve manifold including: a wiring block including a connector electrically connected to the solenoid valves; a pedestal block disposed on the solenoid valve aggregate, an accommodation space in which the wiring block is accommodated being formed in the pedestal block; fixed fitting parts provided on a support wall of the pedestal block so as to oppose each other via the accommodation space; rotation fitting parts provided on end wall portions of both ends of the wiring block, and rotatably supporting the wiring block between an upper holding position and a lateral holding position where the rotation fitting parts are fitted into the fixed fitting parts and the connector becomes an upper state and a lateral state, respectively; operation parts provided on tip parts of elastically deformable leg portions provided on end wall portions of both ends of the wiring block, the operation parts being displaceable in directions of approaching and separating from each other; an operation engaging part provided on the operation parts; and an upward engaging part provided on the pedestal block and engaged with the operation engaging part when the connector is held at the upward position, and a lateral engaging part engaged with the operation engaging part when the connector is held at the lateral position, and engagement with and disengagement from the operation engaging part and rotation of the wiring block are able to be performed by making the operation parts approach each other.

Effects of the Invention

When the wiring block is switched from the upward posture to the lateral posture or from the lateral posture to the upward posture, the operator grips both the operation parts with the fingers of one hand, thereby disengaging the operation engaging part from the upward engaging part or the lateral engaging part. The engagement with and disengagement from the operation engaging part and the rotation of the wiring block can be performed while the operation part is grasped, so that the posture switching operation of the connector can be easily performed and the switching operability can be improved.

DETAILED DESCRIPTION

Figure 1:
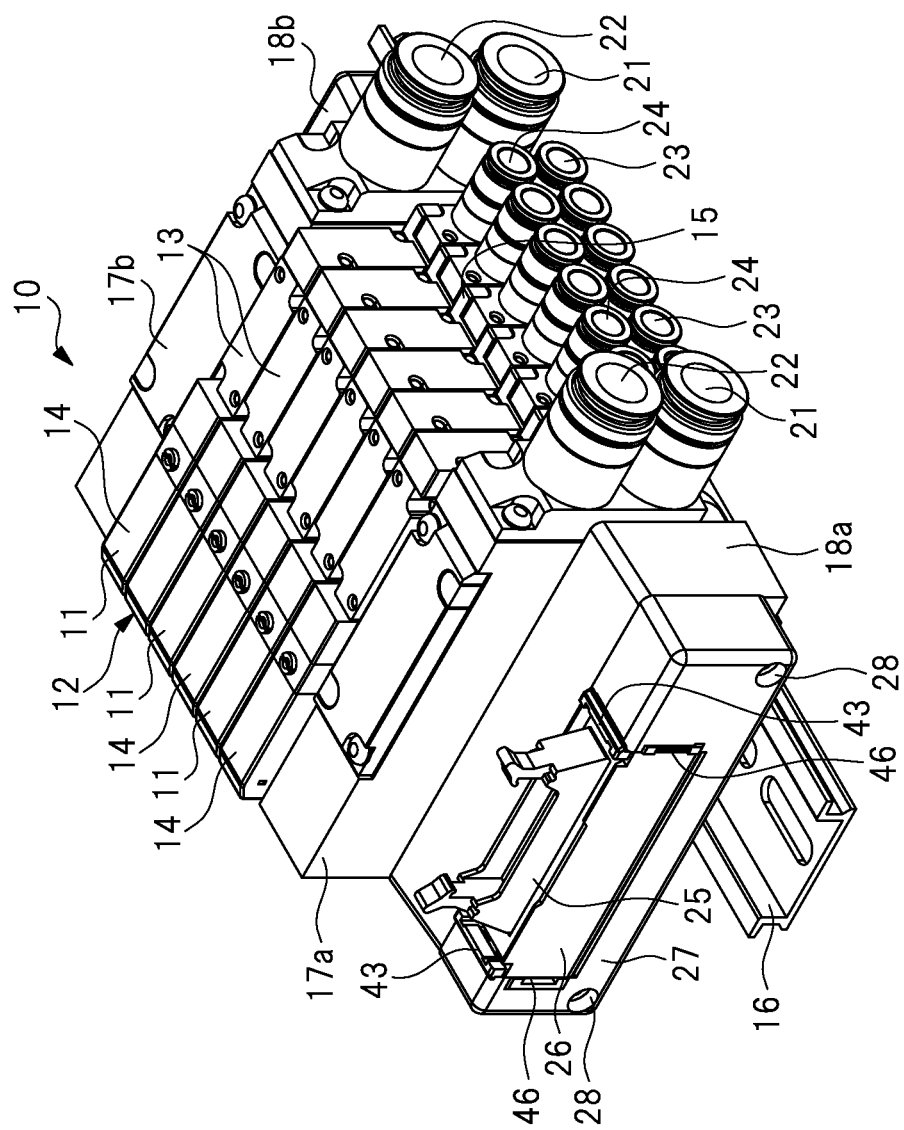
FIG. 1 is a perspective view showing a solenoid valve manifold according to one embodiment.

Hereinafter, embodiments of the present invention will be described in detail with reference to the drawings. A solenoid valve manifold 10 shown in FIG. 1 has a solenoid valve aggregate 12 composed of six solenoid valves 11, and each solenoid valve 11 has a main valve block 13 and a solenoid block 14 installed on it. The main valve block 13 is attached to a manifold block 15, and each manifold block 15 is installed on a support member 16 also referred to as a DIN rail. The main valve block 13 and the solenoid block 14 constitute a solenoid valve, and the solenoid valve aggregate 12 formed by aggregating the six solenoid valves 11 is installed on a support rail by the manifold block 15. An aggregate of the manifold blocks 15 is formed by six manifold blocks 15 which have the same number as the number of solenoid valves 11. Incidentally, the number of solenoid valves 11 constituting the solenoid valve aggregate 12 in FIG. 1 is one example, and the solenoid valve manifold 10 can be assembled by the arbitrary number of solenoid valves 11 as long as the number of solenoid valves is two or more.

Piping blocks 17a, 17b are stricken against both end portions of the solenoid valve aggregate 12, and the piping blocks 17a, 17b are installed on the support member 16 by end blocks 18a, 18b. A supply port 21 and a discharge port 22, each of which is formed of a joint member, are provided in the piping blocks 17a, 17b. A piping connected to an air supply source not shown is connected to the supply port 21, and a discharge pipe is connected to the discharge port 22. Two output ports 23, 24, each of which is composed of a joint member, are provided on a front side of the manifold block 15, and each of the output ports 23, 24 is connected to a pneumatic actuated device by the piping.

Formed in the manifold block 15 are a supply hole and a discharge hole that are not shown. A unshown main valve shaft is incorporated in the main valve block 13. The main valve shaft switches a flow path at a position where the supply hole formed in the manifold block 15 communicates with one output port 23 to supply compressed air to the output port 23 and a position where the supply hole communicates with the other output port 24 to supply compressed air to the output port 24. When the supply hole and the output port 23 are in communication with each other, the output port 24 communicates with the discharge hole. When the supply hole and the output port 24 are in communication with each other, the output port 23 communicates with the discharge hole.

Since the two piping blocks 17a, 17b are provided, compressed air can be supplied from the two supply ports 21 to the supply holes, but only one of the two piping blocks 17a, 17b may be provided.

A unshown solenoid, that is, coil is incorporated in the solenoid block 14. The compressed air is supplied from the supply hole to the main valve shaft by a drive signal supplied to the solenoid, and the main valve shaft is driven in an axial direction. In this way, the solenoid valve 11 is of an indirect actuated type having a pilot solenoid valve.

The coil and the connector 25 are electrically connected to each other by lead wires or a substrate that are not shown.

Consequently, the solenoid valve 11 and the connector 25 are electrically connected to each other. When a cable connector connected to a unshown controller is installed in the connector 25, a connection terminal of the cable connector is connected to a connection terminal provided in the connector 25, and the solenoid valve 11 and the controller are electrically connected via the connector 25.

A wiring block 26 is attached to a pedestal block 27 installed on an end block 18a. The pedestal block 27 is installed on the end block 18a and is disposed at one end portion of the solenoid valve aggregate 12 via the end block 18a. In order to install the pedestal block 27 on the end block 18a, the pedestal block 27 is provided with an installing hole 28, and a screw member is installed in the installing hole 28. The screw member is inserted from an outer side surface of the pedestal block 27, protrudes from an inner side surface, and is screwed to the end block 18a.

The wiring block 26 is attached to the pedestal block 27 so as to be rotatable between an upward holding position where the connector 25 becomes an upward state and a lateral holding position where the connector 25 becomes a lateral state. As shown in FIG. 1, the upward position of the connector 25 is a position where the connector 25 protrudes from a surface opposite to a bottom surface of the solenoid valve 11 installed on the support member 16. The lateral position of the connector 25 is a position where the connector 25 protrudes on an extension of an end portion of the solenoid valve aggregate 12.

As described above, a member provided with the connector 25 is the wiring block 26, and a member rotatably supporting the wiring block 26 and attached to the solenoid valve aggregate 12 via the end block 18a and the like is the pedestal block 27.

Figure 2:
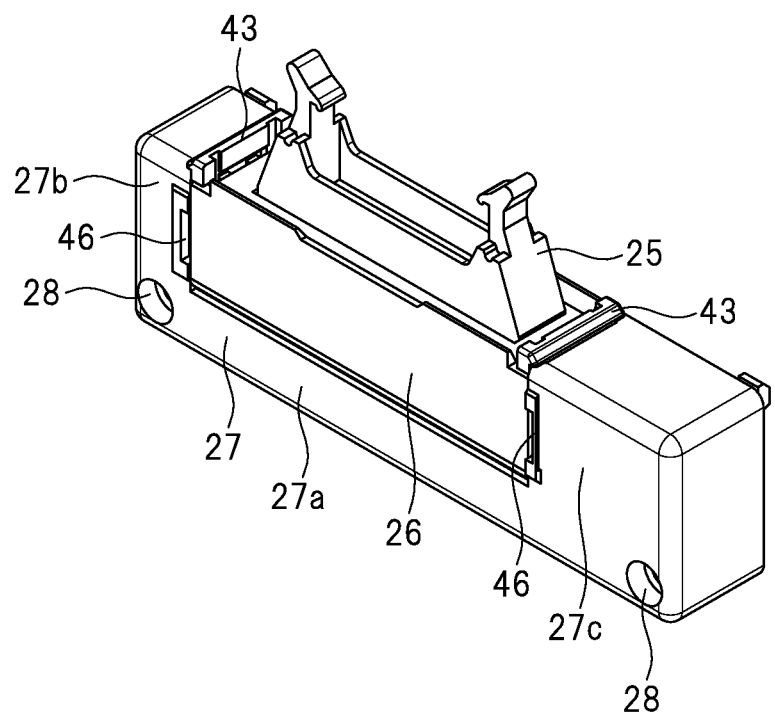
FIG. 2 is a view in which (A) is a perspective view showing a wiring block and a pedestal block in a state where a connector is held at an upward position and (B) is a perspective view showing the wiring block and the pedestal block in a state where the connector is held at a lateral position.
Figure 2:
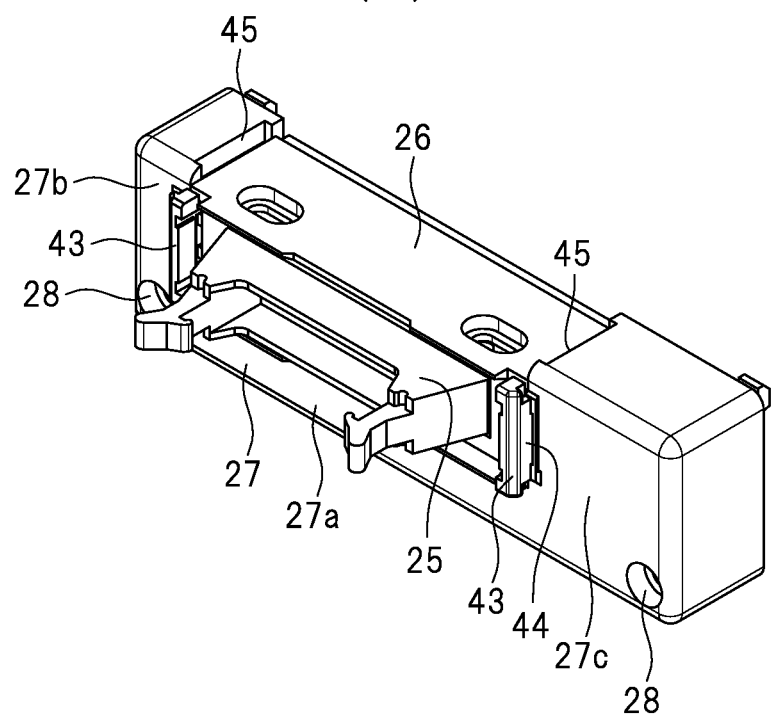
Figure 3:
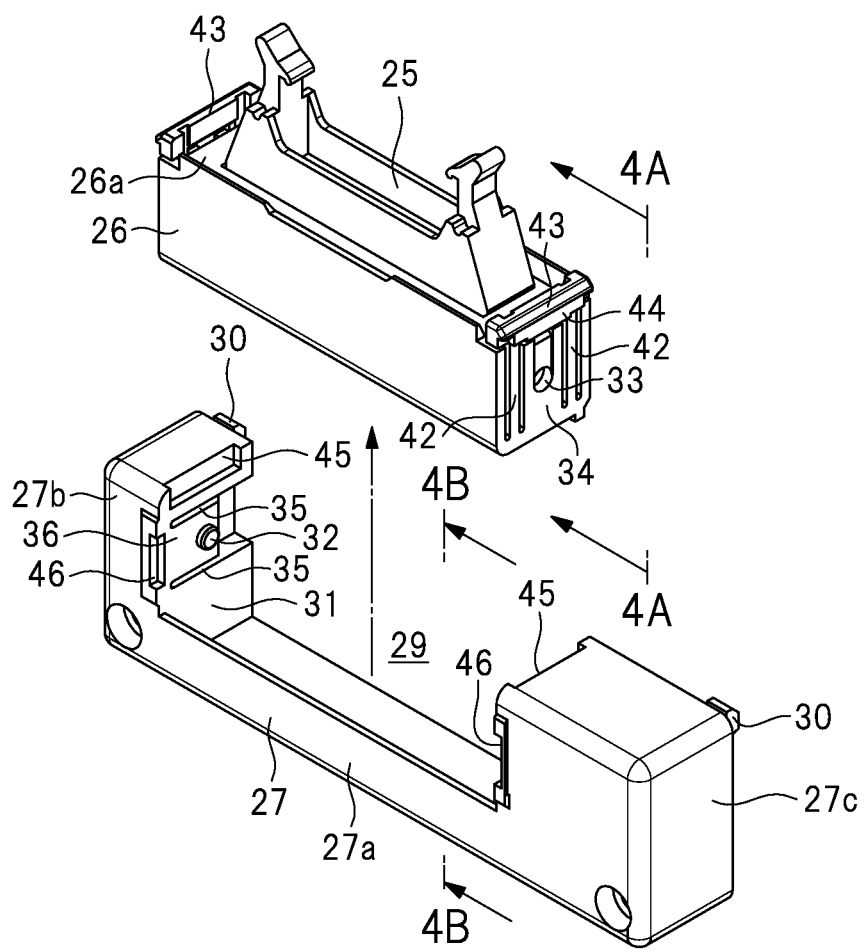
FIG. 3 is an exploded perspective view showing a state of separating the wiring block and the pedestal block.

(A) of FIG. 2 is a perspective view showing the wiring block 26 and the pedestal block 27 in the state where the connector 25 is held at the upward position and (B) of FIG. 2 is a perspective view showing the wiring block 26 and the pedestal block 27 in the state where the connector 25 is held at the lateral position. FIG. 3 is a perspective view showing a state in which the wiring block 26 and the pedestal block 27 are separated from each other.

As shown in FIG. 2, the pedestal block 27 has a base portion 27a extending in a longitudinal direction, and end portions 27b, 27c and is shaped by a resin. As shown in FIG. 3, an accommodation space 29 is provided between the end portions 27b and 27c. A support wall 31 is provided at the end portion 27b of the pedestal block 27, and a support wall 31 is also provided at the other end portion 27c, as shown in (B) of FIG. 6 and (B) of FIG. 7. The both support walls 31 oppose each other via the accommodation space 29. A support pin 32 as a fixed fitting portion is provided on each support wall 31, and the support pin 32 protrudes from the support wall 31 toward the accommodation space 29.

The wiring block 26 has a rectangular parallelepiped shape and is shaped by a resin. The connector 25 attached to the wiring block 26 protrudes from a connector arrangement face 26a of the wiring block 26. The support holes 33 into which the support pins 32 are fitted are provided as rotation fitting portions in end wall portions 34 of both ends of the wiring block 26. The support pins 32 of the pedestal block 27 are respectively fitted, that is, mated into the support holes 33, and thus the wiring block 26 is rotatably supported by the pedestal block 27. Consequently, the wiring block 26 rotates by approximately 90 degrees between the upward holding position where the connector 25 becomes the upward state as shown in (A) of FIG. 2 and the lateral holding position where the connector 25 becomes the lateral state as shown in (B) of FIG. 2.

Figure 4:
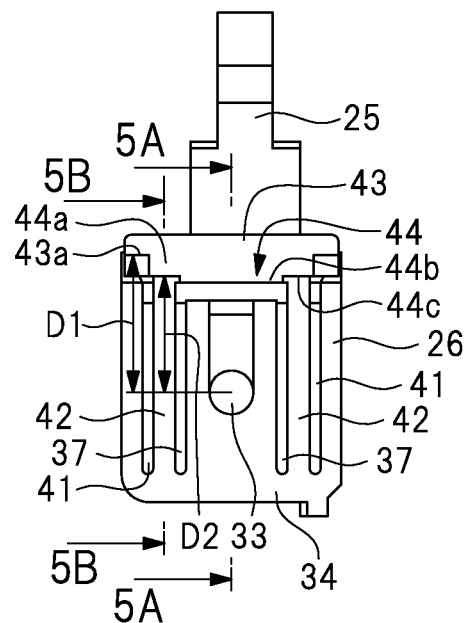
FIG. 4 is a view in which (A) is an arrow view along line 4A-4A in FIG. 3 and (B) is a cross-sectional view taken along line 4B-4B in FIG. 3.
Figure 4:
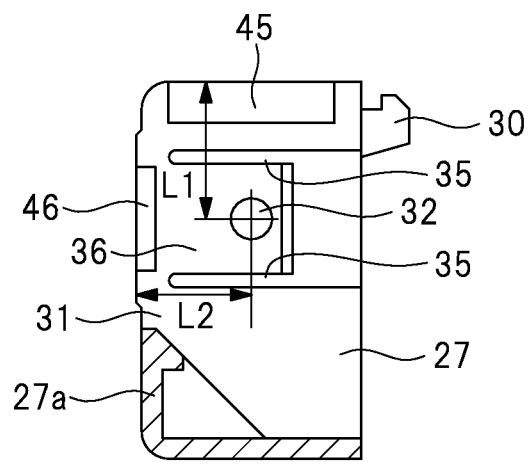
Figure 5:
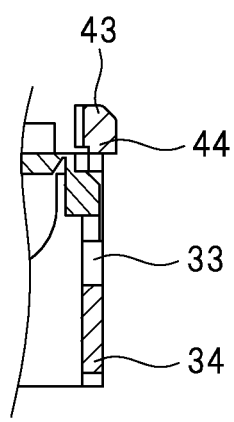
FIG. 5 is a view in which (A) is a cross-sectional view taken along line 5A-5A in (A) of FIG. 4 and (B) is a cross-sectional view taken along line 5B-5B in (A) of FIG. 4.
Figure 5:
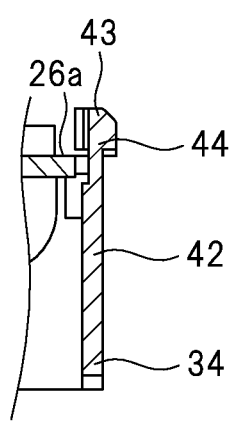

(A) of FIG. 4 is an enlarged arrow view along line 4A-4A in FIG. 3, and (B) of FIG. 4 is an enlarged cross-sectional view taken along line 4B-4B in FIG. 3. (A) of FIG. 5 is a cross-sectional view taken along line 5A-5A in (A) of FIG. 4, and (B) of FIG. 5 is a cross-sectional view taken along line 5B-5B in (A) of FIG. 4.

As shown in (B) of FIG. 4, an engaging claw 30 is provided so as to protrude from the inner side surface of the pedestal block 27, and the engaging claw 30 is engaged with an unshown engaging hole provided in the end block 18a.

As shown in FIG. 4, two slits 35 are provided in the two mutually opposed support walls 31 of the pedestal block 27 so as to open on the inner side surface of the pedestal block 27. An elastic deformation portion 36 is formed by a portion between the slits 35, and the support pin 32 serving as a fixed fitting portion is provided on the elastic deformation portion 36. A tip side of the elastic deformation portion 36 is displaced on the outer side surface of the pedestal block 27 which serves as a base end, and thus an interval between the two support pins 32 changes.

Meanwhile, support holes 33 as rotation fitting portions are provided on end wall portions 34 of both end portions of the wiring block 26. As shown in (A) of FIG. 5, the end wall portion 34 provided with the support hole 33 is shaped continuously with the connector arrangement face 26a, so that it is not elastically deformed.

In this way, the support pin 32 is provided on the elastic deformation portion 36 and the support hole 33 is provided in the end wall portion 34, so that when the wiring block 26 is inserted into the accommodation space 29 of the pedestal block 27, the elastic deformation portion 36 deforms and the support pin 32 is fitted into the support hole 33. This makes it possible to easily assemble the wiring block 26 to the pedestal block 27. In addition, since the elastic deformation portion 36 is not deformed in a state where the pedestal block 27 is assembled to the end block 18a, the wiring block 26 and the pedestal block 27 can be prevented from being erroneously separated.

The support hole 33 may be provided as a fixed fitting portion in the elastic deformation portion 36 of the pedestal block 27 instead of the support pin 32, and the support pin 32 may be provided as a rotation fitting portion on the end wall portion 34 of the wiring block 26 instead of the support hole 33. In this way, the wiring block 26 is also rotatably supported by the pedestal block 27.

As shown in (A) of FIG. 4, the two slits 37 are provided on the end wall portion 34, and slits 41 are provided outside the slits 37 along the respective slits 37. A portion between both slits 37 and 41 is an elastically deformable leg portion 42, and two leg portions 42 are provided on the end wall portion 34 and are separated from the connector arrangement face 26a as shown in (B) of FIG. 5. A leg portion 42 is also provided on the end wall portion 34 on an opposite side of (A) of FIG. 4. The operation part 43 is provided on tip parts of the leg portions 42 so as to couple the two leg portions 42, and the operation part 43 protrudes to an outside of the pedestal block 27 as shown in FIG. 2.

Since the operation parts 43 provided at the both end portions of the wiring block 26 are provided at the tip part of the elastically deformable leg portion 42 so as to protrude from the connector arrangement face 26a of the wiring block 26, an operator can grasp 2 the two operation parts 43 with a finger(s). The two operation parts 43 are displaceable in directions of approaching and separating from each other, and can be displaced in a direction of approaching each other with the finger, so that when the finger is separated from the operation parts 43, the operation parts 43 are displaced in a direction of separating from each other.

An engaging convex part 44 as an operation engaging part is provided on the operation part 43. As shown in (A) of FIG. 4, the engaging convex part 44 protrudes from a bottom surface 43*a* of the operation part 43 in a bottom surface direction of the wiring block 26 and, as shown in (A) of FIG. 5, protrudes further longitudinally outward to the wiring block 26 than the end wall portion 34. The engaging convex part 44 has a first convex part 44*a* and a second convex part 44*b*. The first convex part 44*a* protrudes from the operation part 43 in the bottom surface direction of the wiring block 26. The second convex part 44*b* protrudes from a bottom surface 44*c* of the first convex part 44*a* in the bottom surface direction of the wiring block 26. A width of the first convex part 44*a* is larger than that of the second convex part 44*b*. Meanwhile, as an upward engaging part to be engaged with, that is, caught at the engaging convex part 44, engaging concave parts 45 are provided at upper end portions of both the support wall 31 of the pedestal block 27 by notching the support wall 31 and the upper surface of the pedestal block 27. Further, as a lateral engaging part to be engaged with the engaging convex part 44, an engaging concave part 46 is provided on an outer side surface of the support wall 31 by notching the support wall 31 and the outer side surface of the pedestal block 27.

Figure 6:
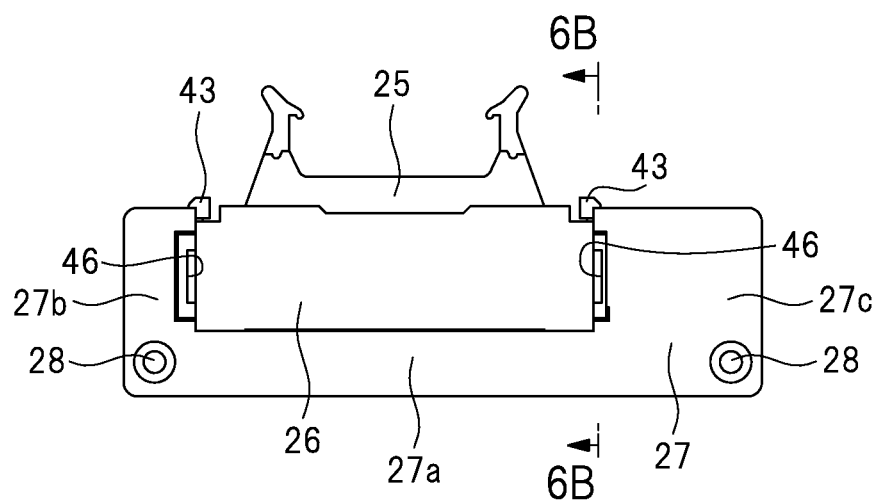
FIG. 6 is a view in which (A) is a front view of (A) of FIG. 2 and (B) is a cross-sectional view taken along line 6B-6B in (A)
Figure 6:
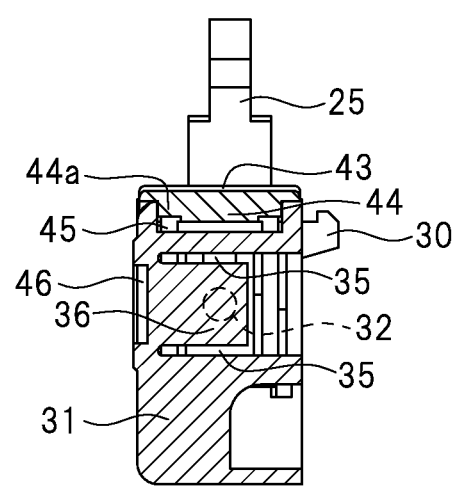
Figure 7:
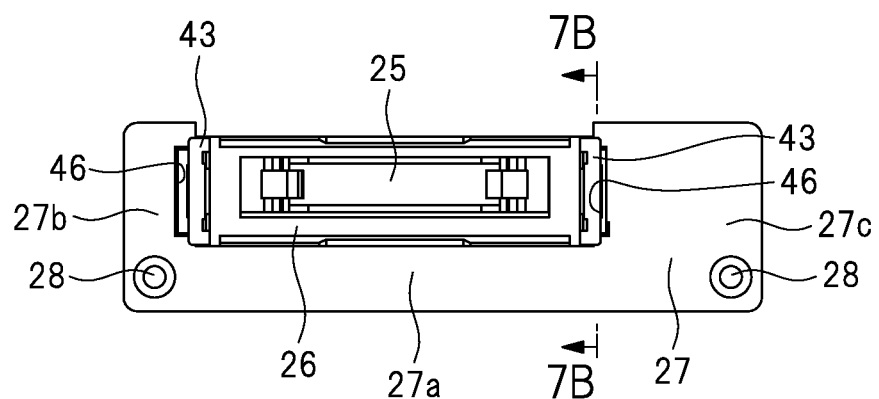
FIG. 7 is a view in which (A) is a front view of (B) of FIG. 2 and (B) is a cross-sectional view taken along line 7B-7B in (A).
Figure 7:
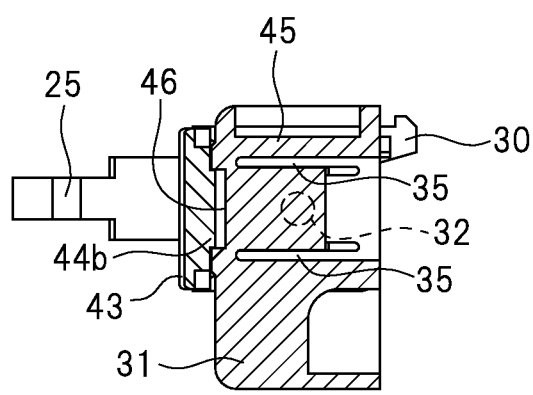

If it is assumed that: D1 is a distance from a center of the support hole 33, that is, a rotation axis to the bottom surface 43*a* of the operation part 43; D2 is a distance from the center of the support hole 33 to the bottom surface 44*c* of the first convex part 44*a*; L1 is a distance from a center of the support pin 32 to an upper surface on which the first engaging concave part 45 opens; and L2 is a distance from the center of the support pin 32 to the outer side surface on which the first engaging concave part opens, L2<D2<L1<D1 is satisfied. As a result, as shown in FIG. 6, the first engaging concave part 45 as an upward engaging part is engaged with the first convex part 44*a* when the connector 25 is held at the upward position. As shown in FIG. 7, the second engaging concave part 46 as a lateral engaging part is engaged with the second convex part 44*b* when the connector 25 is held at the lateral position.

When a posture is switched from a state where the connector 25 becomes an upward posture and the wiring block 26 is held by the pedestal block 27 as shown in (A) of FIG. 2 and (A) of FIG. 6 to a state where the connector 25 becomes a lateral posture and the wiring block 26 is held by the pedestal block 27 as shown in (B) of FIG. 2 and FIG. 7, the operator grips the two operation parts 43 with one hand and displaces the operation parts 43 in a direction in which they approach each other. Consequently, the first convex part 44*a* is separate from the engaging concave part 45, and the wiring block 26 becomes a state of being able to rotate about the support pin 32. Under this state, the wiring block 26 can be rotated from the upward posture to the lateral posture while the operation parts 43 are grasped.

When the finger holding the operation parts 43 is released from the operation parts 43 under a state where the wiring block 26 is rotated to the lateral posture, the second convex part 44*b* is engaged with the engaging concave part 46 as a lateral engaging part by an elastic force of the leg portion 42. Consequently, the wiring block 26 is held at the lateral posture. Meanwhile, even when the wiring block 26 is switched from the lateral posture to the upward posture, the operation parts 43 are gripped by the finger of one hand and the operation parts 43 are displaced in the direction of approaching each other. Consequently, the engagement of the second convex part 44*b* and the engaging concave part 46 is released. Next, the posture can be changed by rotating the wiring block 26 while the operation parts 43 are grasped.

In this way, in the above-mentioned solenoid valve manifold 10, the operator can perform the engagement with and the disengagement from the operation engaging part and the rotation of the wiring block while holding the two operation parts 43 with the finger(s), and the operability of the posture switching operation of the connector 25 can be improved.

The engaging convex part may be provided as a connector engaging part instead of the engaging convex part 44 provided at the tip part of the leg portion 42 of the wiring block 26, and the engaging concave parts 45, 46 provided on the support wall 31 of the pedestal block 27 may be respectively used as an upward engaging part and a lateral engaging part that serve as the engaging convex parts. Also in this way, the wiring block 26 is held in both the upward posture and the lateral posture.

The present invention is not limited to the above-mentioned embodiments, and can variously be modified without a range not departing from the scope of the present invention. For example, the solenoid valve manifold according to one embodiment is a separate type in which the manifold block is installed on each solenoid valve, and the manifold blocks also become an aggregate. However, the above-mentioned wiring blocks can be applied also to such an integrated type of solenoid valve manifold that the plurality of solenoid valves are mounted on a single manifold block. In addition, the mounted solenoid valve can also be a directly actuated type.

INDUSTRIAL APPLICABILITY

The solenoid valve manifold is used, in the technical field of using a pneumatic actuated device, to control the supply of compressed air to the pneumatic actuated device.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A solenoid valve manifold including a solenoid valve aggregate formed by aggregating a plurality of solenoid valves, the solenoid valve manifold comprising:
    a wiring block including a connector electrically connected to the solenoid valves;
    a pedestal block disposed on the solenoid valve aggregate, an accommodation space in which the wiring block is accommodated being formed in the pedestal block;
    fixed fitting parts provided on a support wall of the pedestal block so as to oppose each other via the accommodation space;
    rotation fitting parts provided on end wall portions of both ends of the wiring block, and rotatably supporting the wiring block between an upper holding position and a lateral holding position where the rotation fitting parts are fitted into the fixed fitting parts and the connector becomes an upper state and a lateral state, respectively;
    operation parts provided on tip parts of elastically deformable leg portions provided on end wall portions of both ends of the wiring block, the operation parts being displaceable in directions of approaching and separating from each other;

an operation engaging part provided on the operation parts; and an upward engaging part provided on the pedestal block and engaged with the operation engaging part when the connector is held at the upward position, and a lateral engaging part engaged with the operation engaging part when the connector is held at the lateral position, wherein engagement with and disengagement from the operation engaging part and rotation of the wiring block are able to be performed by making the operation parts approach each other.

2. The solenoid valve manifold according to claim 1, wherein each of the fixed fitting parts is a support pin protruding from the support wall, and the rotation fitting part is a support hole into which the support pin is fitted.

3. The solenoid valve manifold according to claim 1, wherein the upward engaging part and the lateral engaging part are each an engaging concave part, and the operation engaging part is an engaging convex part engaged with the engaging concave part.

4. The solenoid valve manifold according to claim 3, wherein the engaging convex part has a first convex part protruding from a bottom surface of the operation part in a bottom surface direction of the wiring block, and a second convex part protruding from a bottom surface of the first convex part in the bottom surface direction of the wiring block, and the engaging concave part has a first engaging concave part formed by notching an upper surface of the pedestal block and the support wall, and a second engaging concave part formed by notching an outer side surface of the pedestal block and the support wall.

5. The solenoid valve manifold according to claim 4, wherein a width of the first convex part is larger than a width of the second convex part.

6. The solenoid valve manifold according to claim 4, wherein if it is assumed that a distance from a rotation axis to the bottom surface of each of the operation parts is D1, a distance from the rotation axis to the bottom surface of the first convex part is D2, a distance from the rotation axis to an upper surface in which the first engaging concave part opens is L1, and a distance from the rotation axis to an outer side surface in which the first engaging concave part opens is L2, $L2<D2<L1<D1$ is satisfied.

7. The solenoid valve manifold according to claim 1, wherein the wiring block has a connector arrangement face from which the connector protrudes, a gap is formed between the leg portion and the connector arrangement face, and the end wall portion is formed to be continuous with the connector arrangement face.

8. The solenoid valve manifold according to claim 1, wherein each of the fixed fitting parts is provided in an elastic deformation portion provided on the support wall, and each of the rotation fitting parts is provided on the end wall portion so as to be capable of fitting the fixed fitting parts and the rotation fitting parts by elastically deforming the elastic deformation portion when the wiring block is attached to the pedestal block.

9. The solenoid valve manifold according to claim 1, wherein each of the solenoid valves includes:

a main valve block provided with a main valve shaft for switching a flow path; and solenoid blocks installed on the main valve block, the solenoid valves are attached to the manifold blocks each provided with an output port, and an aggregate of the manifold blocks is installed on a support member.

* * * * *